Figure 1:
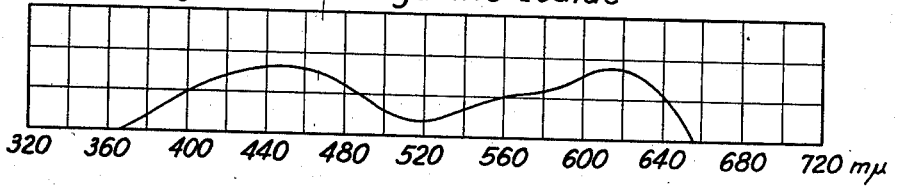

2,2'-Diethyloxadicarbocyanine Iodide 2,2'-Diethyl-5,6,5',6'-dibenzoxadicarbocyanine Iodide 2,2'-Diethyl-3,4,3',4'-dibenzoxadicarbocyanine Iodide Patented Oct. 15, 1940

2,218,450

UNITED STATES PATENT OFFICE 2,218,450

PROCESS FOR PREPARING DICARBOCYANINE DYES

Frances M. Hamer, Harrow, England, assignor to Eastman Kodak Company, Rochester, N. Y., a corporation of New Jersey Application March 31, 1938, Serial No. 199,219

3 Claims. (Cl. 260—240)

This invention relates to dyes and more particularly to dyes or salts of the dicarbocyanine group and to photographic emulsions sensitized therewith.

It is known that certain thiadicarbocyanine dyes or salts can be prepared from 1-methylbenzothiazole alkiodides by condensation with β-anilinoacrolein anil hydrochloride, in the presence of a basic condensing agent and an organic acid anhydride, but oxadicarbocyanine dyes cannot be prepared by condensing 1-methylbenzoxazole alkiodides with the aforesaid anil salts, in the presence of a basic condensing agent and an organic acid anhydride. Furthermore, oxadicarbocyanine dyes cannot be prepared by condensation of 1-methylbenzoxazole alkylsulfates with the aforesaid anil salts, in the presence of a basic condensing agent and an organic acid anhydride. I have now found that oxadicarbocyanine salts can be prepared by condensing 1-methylbenzoxazole alkyltoluenesulfonates with β-anilinoacrolein anil salts, in the presence of a basic condensing agent and an organic acid anhydride. I have further found that dibenzoxadicarbocyanine dyes can be prepared by condensing μ-methylnaphthoxazole alkyltoluenesulfonates with β-anilinoacrolein anil salts, in the presence of a basic condensing agent and an organic acid anhydride. I have further found that these new dyes sensitize photographic emulsions in a new and useful manner.

It is, accordingly, an object of my invention to provide new dyes. A further object of my invention is to provide oxadicarbocyanine and dibenzoxadicarbocyanine dyes. A further object is to provide a process for the preparation of such dyes. A still further object is to provide new optically sensitized photographic emulsions. A still further object is to provide photographic emulsions sensitized with oxadicarbocyanine dyes and with dibenzoxacarbocyanine dyes. Other more specific objects will become apparent hereinafter.

My new dyes can be represented by the following general formula:

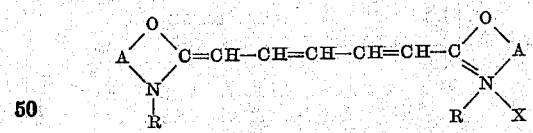

wherein A represents a phenylene or naphthylene group, R represents an alkyl group, such as methyl, ethyl, β-ethoxyethyl, n-amyl or benzyl for example, and X represents an acid radical, such as chloride, bromide, iodide, perchlorate or alkyltoluenesulfonate, for example.

In preparing my new dyes, I have found it advantageous to employ 1-methylbenzoxazole and μ-methylnaphthoxazole alkyl-p-toluenesulfonates. The 1-methylbenzoxazole and μ-methylnaphthoxazole alkyltoluenesulfonates can contain nuclear substituents on the benzene and naphthalene nuclei. The β-anilinoacrolein anil salt is advantageously the hydrochloride. The benzene nuclei of the β-anilinoacrolein anil salt can contain substituents. As basic condensing agents, I have found that alkali metal salts of fatty acids, particularly fatty acids of from two to four carbon atoms, are advantageously employed. However, sodium carbonate, sodium hydroxide, potassium carbonate or triethylamine, for example, can be employed as basic condensing agents. As organic acid anhydrides, fatty acid anhydrides, particularly those of fatty acids containing from two to four carbon atoms, are advantageously employed. Heat accelerates the formation of my new dyes. Diluents can be employed in the reaction mixture.

As is clear from the foregoing, my new dyes are formed as the alkyltoluenesulfonates. These dye-alkyltoluenesulfonates are advantageously converted into the less soluble dye-halides, particularly the dye-iodides, before purification of the dye.

While the process of my invention is subject to variation, particularly with respect to the nature and quantity of the 1-methylbenzoxazole and μ-methylnaphthoxazole alkyl toluenesulfonates employed, the nature and quantity of the β-anilinoacrolein anil salt employed, the nature and quantity of the basic condensing agent, the nature and quantity of organic acid anhydride employed, the temperatures employed, the time of reaction, the order of procedure and the method of isolation and purification of the dyes, the following examples will serve to illustrate the mode of practicing the process of my invention. These examples are not intended to limit my invention. The parts given are by weight.

EXAMPLE 1.—*2.2-diethyloxadicarbocyanine iodide*

5 parts (2 mols.) of 1-methylbenzoxazole etho-p-toluenesulfonate, 2 parts (1 mol.) of β-anilinoacrolein anil hydrochloride and 3 parts of anhydrous potassium acetate were added to 18 parts of acetic anhydride. The mixture was warmed to 60° C. and stirred for about 9 minutes. During this time, the temperature was raised to about 130° C. The mixture was rapidly stirred not more than one minute longer, during which time the temperature was maintained at 130° to 134° C. The reddish colored reaction mixture was poured into a cold solution of potassium iodide (10 parts in 180 parts of water). A tar having a green luster separated. The mixture was cooled with ice for several hours. The aqueous portion was then decanted and the remaining tar was washed with water and then with a mixture of methyl alcohol and ethyl acetate (one part of methyl alcohol and 19 parts of ethyl acetate). The remaining oxadicarbocyanine dye was recrystallized from methyl alcohol and obtained as steel-blue crystals. When dissolved in methyl alcohol, these crystals gave a solution which was purple by transmitted light and red by reflected light. The steel-blue crystals melted at 232° C. with decomposition. The formula of this dye can be expressed as follows:

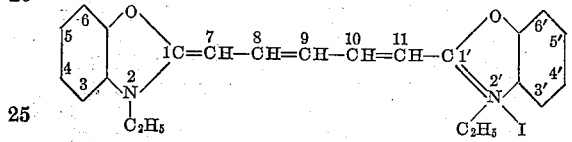

EXAMPLE 2.—*2,2'-diethyl-5,6,5',6'-dibenzoxadicarbocyanine iodide*

5 parts of 1-methyl-α-naphthoxazole etho-p-toluenesulfonate, 1.7 parts of β-anilinoacrolein anil hydrochloride and 5 parts of anhydrous potassium acetate were added to 23 parts of acetic anhydride. The mixture was put into a bath at 60° C. and stirred while the temperature rose to about 130° C. This required about 8 minutes. Heating and stirring were continued for about one minute at 130° to 131° C. The reaction mixture was then poured into a solution of 9 parts of potassium iodide in 290 parts of water. The resulting mixture was allowed to stand for a few hours. Then, the aqueous layer was decanted from the tar which had formed. The tar solidified upon grinding it with a mixture of ethyl acetate (9 parts) and methyl alcohol (1 part). The dye has the following formula:

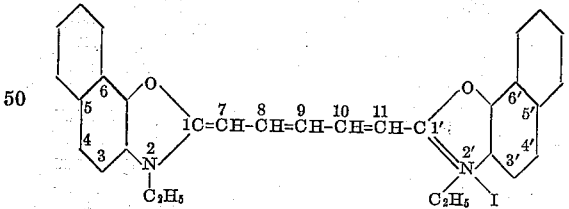

Upon recrystallization from methyl alcohol, the dye was obtained as dark green crystals, melting at 234° C. with decomposition. The methyl alcoholic solution of the dye was blue by transmitted light and purple by reflected light.

EXAMPLE 3.—*2,2'-diethyl-3,4,3',4'-dibenzoxadicarbocyanine iodide*

5 parts of 2-methyl-β-naphthoxazole etho-p-toluenesulfonate, 1.7 parts of β-anilinoacrolein anil hydrochloride and 4 parts of anhydrous sodium acetate were added to 21 parts of acetic anhydride. The mixture was rapidly stirred in a bath at 70° C. The temperature was raised to about 130° C. over a period of about 6 minutes. Heating at 130° to 131° C. was continued for about one minute. The reaction mixture was then poured into a cold solution of 9 parts of potassium iodide in 200 parts of water. The resulting mixture was then allowed to stand for several hours. The aqueous part was removed from the solid residue by filtration. The residue was washed with water and then dissolved in 22 parts of ethyl acetate and 1 part of methyl alcohol. The resulting solution was cooled on ice for several hours. The solid which separated was boiled out with methyl alcohol. The residue was recrystallized from methyl alcohol. The dye was obtained as bright green crystals which melted at 253° to 259° C. with decomposition. These crystals dissolved in methyl alcohol gave a solution blue by transmitted light and purple by reflected light. The dye has the following formula:

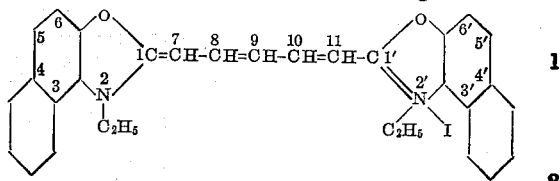

In the above examples, instead of converting the dye-sulfonates to the dye-iodides, the dye-sulfonates can be converted to the dye-bromides or dye-perchlorates in exactly the same manner as that set forth for the dye-iodides.

My new dyes give rise to photographic emulsions possessing novel sensitivity when incorporated therein. Employing my new dyes, I have found a method of sensitizing emulsions strongly to the red without appreciably sensitizing the emulsions to the green. In other words, by means of my new dyes, I can prepare photographic emulsions in which the ratio of red to green sensitivity is high. Such emulsions cannot be prepared employing heretofore known dicarbocyanine dyes. My new oxadicarbocyanine and 5,6,5',6'-dibenzoxadicarbocyanine dyes are particularly useful in preparing emulsions of high red to green ratio.

My invention is particularly directed to the sensitization of the customarily employed gelatino-silver-halide emulsions. However, my new dyes can be employed in emulsions in which the carrier is other than gelatin, for example, a resinous substance or cellulosic derivative which has substantially no deleterious effect on the light-sensitive materials. As silver halide emulsions, I include such emulsions as are commonly employed in the art, for example, silver chloride or silver bromide emulsions which can contain other salts which may be light-sensitive. By way of illustration, the herein-described sensitized photographic emulsions were prepared employing ordinary gelatino-silver-bromide emulsions.

In the preparation of photographic emulsions containing my new dyes, it is only necessary to disperse the dyes in the emulsions. The methods of incorporating dyes in emulsions are simple and well known to those skilled in the art. In practicing my invention, it is convenient to add the dyes from their solutions in appropriate solvents. The solvent must, of course, be compatible with the emulsion, substantially free from any deleterious effect on the light-sensitive materials and capable of dissolving the dyes. Methanol has proven satisfactory as a solvent for my new dyes. The dyes are advantageously incorporated in the finished, washed emulsion and should be uniformly distributed throughout to secure best results.

The concentration of my new dyes employed in the emulsions can vary widely, e. g., from 5 to 100 mg. per liter of emulsion. The concentration of the dye will vary according to the type of light-sensitive material in the emulsion and according to the effects desired. The suitable and most economical concentration for any given emulsion will be apparent to those skilled in the art, upon making the ordinary tests and observations customarily employed in the art of emulsion making. To prepare a gelatino-silver-halide emulsion, the following procedure is satisfactory. A quantity of the dye is dissolved in methyl alcohol or acetone and a volume of this solution (which may be diluted with water) containing from 5 to 100 mg. of dye is slowly added to about 1000 cc. of a flowable gelatino-silver-halide emulsion with stirring. Stirring is continued until the dye is uniformly and practically homogeneously dispersed. Ordinarily 10 to 20 mg. of dye per 1000 cc. of flowable emulsion will suffice to produce the maximum sensitizing effect with the ordinary gelatino-silver-halide emulsions. The above statements are only illustrative and are not to be understood as limiting my invention in any sense, as it will be apparent that my dyes can be incorporated by other methods in many of the photographic emulsions customarily employed in the art, such, for instance, as by bathing a plate or film, upon which the emulsion has been coated, in a solution of the dye in an appropriate solvent, although such a method is ordinarily not to be preferred. The claims are intended to cover any combination of these new dyes with a photographic silver halide emulsion, whereby the dye exerts a sensitizing effect on the emulsions, as well as a photographic element comprising a support, ordinarily transparent, upon which the light-sensitive material is coated or spread and allowed to dry.

The accompanying drawing is by way of illustration and depicts the sensitivity of emulsions containing three of my new dyes. Each figure of the drawing is a diagrammatic reproduction of a spectrogram showing the sensitivity of a silver bromide emulsion containing one of my new dyes.

In Fig. 1, the sensitivity of an ordinary gelatino-silver-bromide emulsion containing 2,2'-diethyloxacarbocyanine iodide is depicted.

Figure 2:
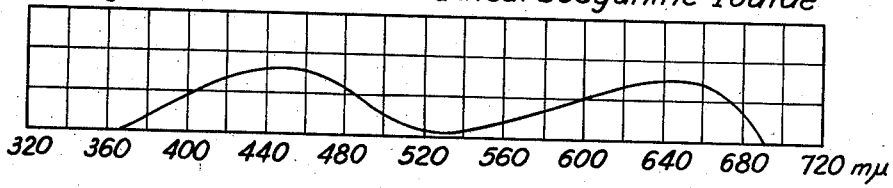

In Fig. 2, the sensitivity of an ordinary gelatino-silver-bromide emulsion containing 2,2'-diethyl-5,6,5',6'-dibenzoxacarbocyanine iodide is depicted.

Figure 3:
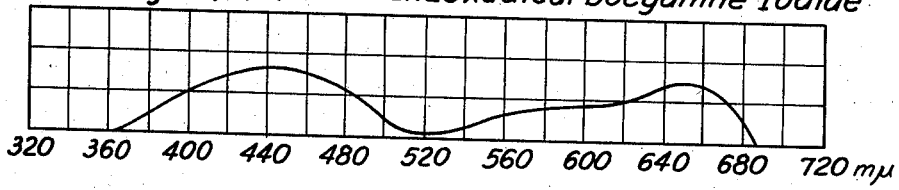

In Fig. 3, the sensitivity of an ordinary gelatino-silver-bromide emulsion containing 2,2'-diethyl-3,4,3',4'-dibenzoxacarbocyanine iodide is depicted.

From the figures of the drawing, it is clear that my new emulsions have a high red-green ratio of sensitivity. In all cases, my new dyes sensitize cleanly, i. e., without producing fog. My new dyes are useful in the preparation of light filters.

Still further illustrations of my new dyes and emulsions could be provided, but the foregoing are believed to demonstrate the manner of practicing my invention.

1 - methylbenzoxazole and $\mu$ - methylnaphthoxazole aralkyl iodides can be prepared by heating 1-methylbenzoxazoles or $\mu$-methylnaphthoxazoles with aralkyl bromides. The resulting cyclammonium aralkyl bromides can be converted into the aralkyl iodides by treatment with an aqueous solution of potassium iodide.

1 - methylbenzoxazole and $\mu$ - methylnaphthoxazole alkoxyalkyl iodides can be prepared by heating 1-methylbenzoxazole or $\mu$-methylnaphthoxazole with alkoxyalkyl-p-toluenesulfonates. The resulting cyclammonium alkoxyalkyl-p-toluenesulfonates can be converted into the alkoxyalkyl iodides by treatment with an aqueous solution of potassium iodide.

What I claim and desire to be secured by Letters Patent of the United States is:

1. A process for preparing a carbocyanine dye comprising condensing an alkyl toluenesulfonate quaternary salt selected from the group consisting of 1-methylbenzoxazole and $\mu$-methylnaphthoxazole alkyl toluenesulfonate quaternary salts with a $\beta$-anilinoacrolein anil salt, in the presence of a basic condensing agent and an organic acid anhydride.

2. A process for preparing a carbocyanine dye comprising condensing an alkyl toluenesulfonate quaternary salt selected from the group consisting of 1-methylbenzoxazole and $\mu$-methylnaphthoxazole alkyl p-toluenesulfonate quaternary salts with a $\beta$-anilinoacrolein anil salt in the presence of a basic condensing agent and an organic acid anhydride.

3. A process for preparing a carbocyanine dye comprising condensing an alkyl toluenesulfonate quaternary salt selected from the group consisting of 1-methylbenzoxazole and $\mu$-methylnaphthoxazole alkyl p-toluenesulfonate quaternary salts with $\beta$-anilinoacrolein anil hydrochloride, in the presence of a basic condensing agent and an organic acid anhydride.

FRANCES M. HAMER.